UNITED STATES PATENT OFFICE.

GEORGE W. SPANGLE, OF CLIFTON SPRINGS, NEW YORK.

IMPROVED BURNING-FLUID.

Specification forming part of Letters Patent No. 58,905, dated October 16, 1866.

*To all whom it may concern:*

Be it known that I, GEORGE W. SPANGLE, of Clifton Springs, Ontario county, New York, have invented a new and useful Burning-Fluid, which I denominate "Petro Oil," intended, chiefly, for use in lamps; and I do hereby declare the following to be a full and clear description of my mode of compounding and preparing said fluid.

I use as the basis of my compound some of the lighter products obtained from petroleum, preferring gasoline, which is the lightest and most inflammable, on account of its cheapness. This product I render inexplosive by the use of sal-soda and cream of tartar, and I neutralize or disguise the unpleasant odor of the gasoline or other light product of petroleum by the use of oil of winter-green or its equivalent, using for this purpose about the following proportions:

To one barrel of forty gallons of gasoline I use one pound of sal-soda and one-half pound of cream of tartar. These ingredients should both be inserted at the same time, and the whole should be well agitated. It should then be left open for twenty-four hours. Two ounces of the oil of winter-green should then be added, and when thoroughly agitated the fluid is ready for use. It will then be found to have nearly lost its offensive odor, as well as its property of rapid evaporation. It will be no longer explosive, and can be burned in a lamp with perfect safety, furnishing a clear and beautiful light. It may also be used in varnishes and paints with entire success.

I am aware that some of the other essential oils have been used for this purpose; but I claim that the oil of winter-green has a peculiar efficacy in producing the desired effect.

What, therefore, I claim as my invention, and desire to secure by Letters Patent, is—

1. The method above described for rendering any of the products obtained from petroleum inexplosive and safe as a burning-fluid by the use of sal-soda and cream of tartar, substantially as above described.

2. The removal of the unpleasant odor of any of the above-mentioned products by the use of the oil of winter-green, substantially as described.

In witness whereof I have hereunto subscribed my name this 18th day of January, A. D. 1866.

GEORGE W. SPANGLE.

Witnesses:
R. T. CAMPBELL,
EDW. SCHAFER.